No. 798,852. PATENTED SEPT. 5, 1905.
D. D. WEISELL.
ANESTHETIC GENERATOR AND MIXER.
APPLICATION FILED MAY 19, 1904.
2 SHEETS—SHEET 1.
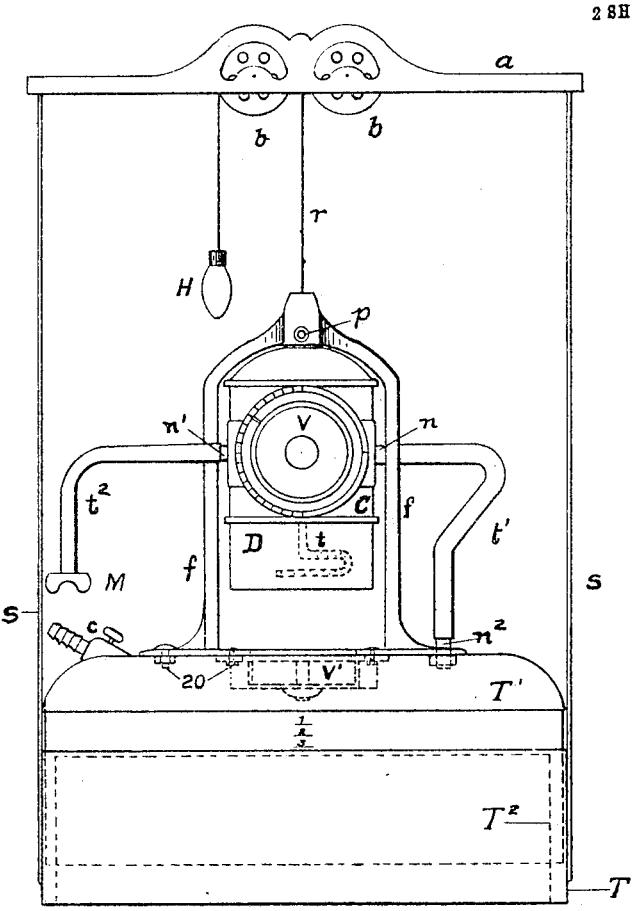
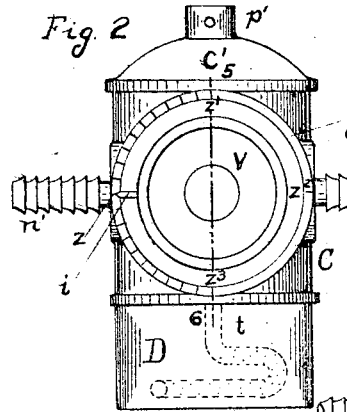
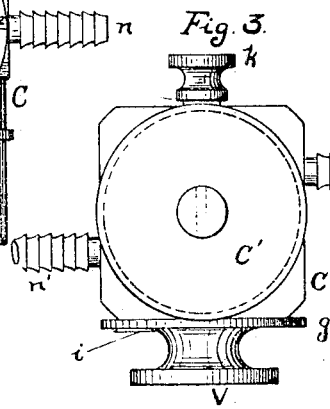
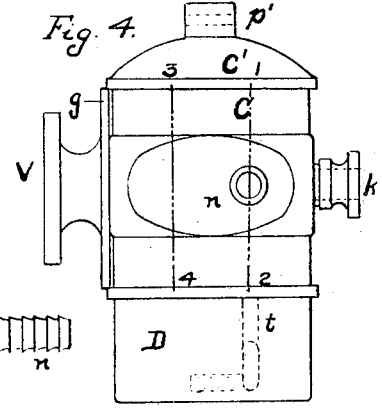
WITNESSES:
C. E. Williams
I. U. Taylor
INVENTOR
David D. Weisell
BY
Elwin M. Hulse
ATTORNEY

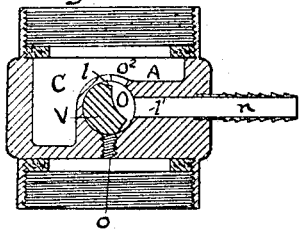
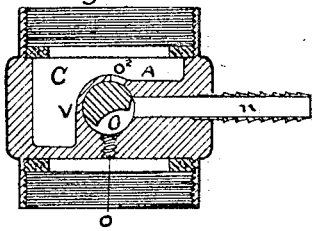
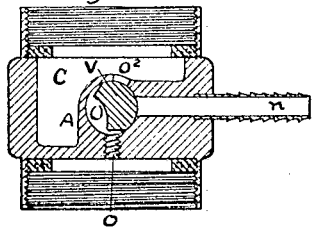
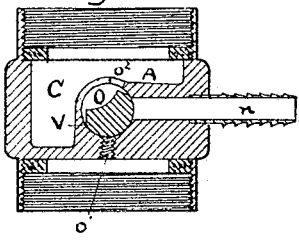
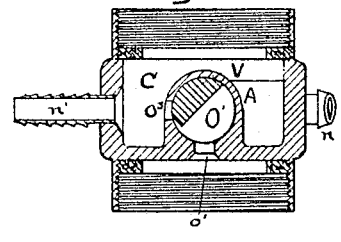
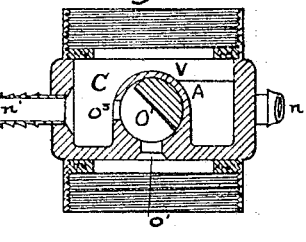
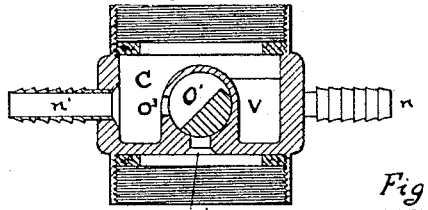
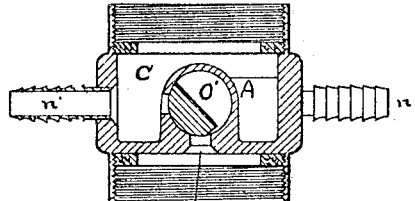
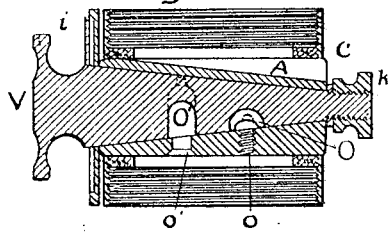
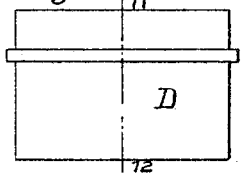
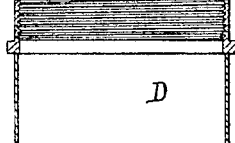
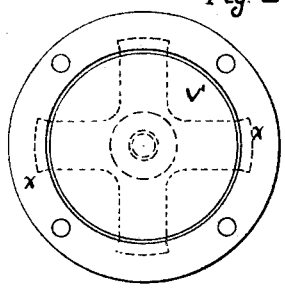
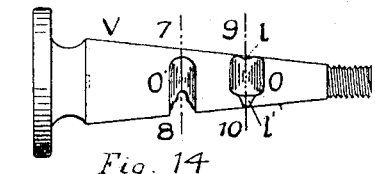
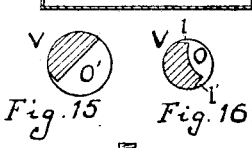
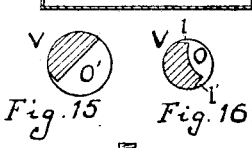
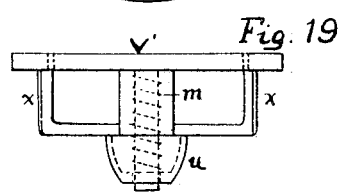
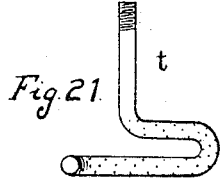

UNITED STATES PATENT OFFICE.

DAVID D. WEISELL, OF FORT WAYNE, INDIANA, ASSIGNOR TO THE RANSOM AND RANDOLPH COMPANY, OF TOLEDO, OHIO, A CORPORATION OF OHIO.

ANESTHETIC GENERATOR AND MIXER.

No. 798,852.     Specification of Letters Patent.     Patented Sept. 5, 1905.

Application filed May 19, 1904. Serial No. 208,788.

*To all whom it may concern:*

Be it known that I, DAVID D. WEISELL, a citizen of the United States, residing at Fort Wayne, in the county of Allen and State of Indiana, have invented a new and useful Anesthetic Generator and Mixer, of which the following is a specification.

My invention relates to improvements in apparatus for the generation and administration of anesthetic in which the quantity of anesthetic generated and the amount of air to be mixed therewith is under the control of the operator.

The medical or dental operator when administering an anesthetic or any medicated vapor to a patient in the common or well-known modes of open administration, such as by the use of a sponge or funnel or cloth, has no means of ascertaining the relative proportion of anesthetic and of air in the mixture which the patient inhales, and as a result more or less danger has always accompanied such administration.

The object of my invention is to enable the operator to accurately graduate the quantity of anesthetic or medicated vapor generated and the amount of air mixed therewith, so as to give him absolute control of its strength and avoid the danger of the sudden administration of too great a quantity or strength of anesthetic or medicated vapor, by providing a generating and mixing chamber with a valve which graduates and controls the inlet of air, the generation and inlet of the anesthetic vapor, and the mixture of said vapor with air. I attain this object by the mechanism illustrated in the accompanying drawings, in which—

Figure 1 is a front elevation of the entire apparatus; Fig. 2, a front elevation of the generating and mixing device removed from the compressed-air tank and frame; Fig. 3, a plan view of the generating and mixing device; Fig. 4, a side elevation of the same; Figs. 5, 6, 7, and 8, a vertical section of the same on the line 1 2 with the cover and anesthetic-cup removed and with the controlling-valve in the positions $z$, $z'$, $z^2$, and $z^3$, respectively; Figs. 9, 10, 11, and 12, a vertical section of the same on line 3 4 with the controlling-valve in the $z$, $z'$, $z^2$, and $z^3$ positions, respectively; Fig. 13, a vertical section of the same on line 5 6 with the controlling-valve in the position $z'$; Fig. 14, a side elevation of the controlling-valve; Fig. 15, a vertical section of the same on line 7 8; Fig. 16, a vertical section of the same on line 9 10; Fig. 17, a front elevation of the anesthetic-generating cup, and Fig. 18 a vertical section of the same on line 11 12; Fig. 19, an elevation of the compressed-air-tank valve, and Fig. 20 a top view of the same, and Fig. 21 a view of the anesthetic-air tube.

Similar letters and figures refer to similar parts throughout the several views.

Any suitable means for compressing air and connecting the same to the generating and mixing device may be used. I show one means in which a compressed-air tank is composed of three parts—an outer cylinder T, with closed bottom and open top, into which is placed a smaller cylinder $T^2$, with closed top, as a core, between which two cylinders slides another cylinder T', with a closed top. The space between cylinder T and $T^2$ is nearly filled with water, which acts as a sliding bottom for cylinder T' as it moves up and down in cylinder T. In the top of cylinder T' is placed a valve V' for the entrance of air, and mounted by suitable bolts 20 on the top of the same is a frame *f*, which supports for convenience of use only by pin *p* the generating and mixing device. Said cylinder T' also carries in its top a nipple $n^2$, which for convenience passes through the base of frame *f* and is provided at its lower end with threads, so as to act as an additional means for mounting frame *f* on said tank. To the cylinder T are secured standards *s s*, which support a framework *a*, on which are mounted pulleys *b b*, over either one of which passes a cord *r*, attached at one end to the top of the frame *f* and provided at its other end with a suitable grip or handle H as a means for raising cylinder T' in cylinder T.

The generating and mixing device is provided with a chamber C, to the top of which a cover C' is adapted, the peak of the cover having an opening *p'* therein, through which and through a corresponding opening in the top of frame *f* a pin *p* passes to support the whole device in frame *f*. The generating and mixing device may be used without placing it in frame *f*, and I provide the said frame merely for the sake of convenience. In the bottom of chamber C is adapted another chamber or cup D, in which is placed the liquid or anesthetic to be used. I prefer to make this chamber D of glass, so that the entrance of air through the perforated tube $t$ into this generating-chamber D may be observed. The air bubbling up through the liquid or anesthetic in chamber D as it escapes through the perforations in tube $t$ produces the anesthetic or medicated vapor which is later inhaled by the patient. The upper end of this tube $t$ extends or is adapted to an opening $o$ in the bottom of chamber C, which opening extends into a valve-sleeve A in said chamber C, to which sleeve is adapted a controlling-valve V, held in said sleeve by a thumb-screw $k$. A further opening $o'$ in the bottom of said chamber C permits the anesthetic vapor generated in chamber D to pass into the sleeve A. The controlling-valve V is provided with two horizontal or lateral grooves O and O', as shown in Fig. 14 and in section in Figs. 13, 15, and 16, groove O being for the conveyance of air which enters through the nipple $n$ into the mixing-chamber C by way of an opening $o^2$ in the top of sleeve A and into the generating-chamber D through opening $o$ and perforated tube $t$, and grooves O' being for the conveyance or direction of the anesthetic or medicated vapor generated in chamber D and escaping from opening $o'$ in the bottom of chamber C into the mixing-chamber C through an opening $o^3$ in the wall of sleeve A. A nipple $n'$ in the outside wall of chamber C is for the conveyance or escape of the vapor for the purpose of inhalation by the patient through a tube $t^2$ and mouth or nose hood M. Any of the many forms of nose or mouth hoods may be used. Nipple $n$ and nipple $n^2$ in the top of tank T T' are connected by a suitable tube $t'$, preferably of rubber.

I prefer to taper the valve V and its sleeve A so as to insure perfect contact of said valve in said sleeve and avoid any leakage of air or vapor.

The groove O in the valve V is not of the same depth throughout, but it is given a curve in its central portion, as shown in Figs. 13, 14, and 16, and its bottom does not come to the surface of the valve abruptly, but each end terminates in a tapering extension or additional groove $l$ and $l'$, respectively, which extensions slant approximately at a right angle to said curved groove O upward to the outside surface of the valve. This groove O and its tapering extensions $l$ and $l'$ are made long and deep enough to permit air to enter freely into chamber C through opening $o^2$ and at the same time permit a slight quantity of air to enter through extension $l'$ and through opening $o$ and tube $t$ into chamber D, which latter quantity of air increases and the former quantity decreases as the valve V is turned in its sleeve A, it being apparent from Figs. 5 and 9 that as the valve is turned in its sleeve from left to right from the $z$ position, Fig. 2, the tapering extension $l'$ as it approaches opening $o$ gradually increases the amount of air entering chamber D, while the tapering extension $l$ as it approaches opening $o^2$ gradually reduces the amount of air entering through that opening into the mixing-chamber C, the result being that the continued revolution of the valve finally closes opening $o^2$, while opening $o$ is freed and the air enters into chamber D exclusively, as described later on.

Groove O' serves the purpose of directing the vapor which is generated in chamber D and rises into opening $o'$ into the mixing-chamber C through opening $o^3$, and it is situated in the valve V in relation to groove O, so that when the tapering extension $l'$ of groove O begins to admit air through opening $o$ into the generating-chamber D the tapering end of groove O' begins to admit vapor through opening $o^3$ into chamber C, opening $o'$ being also freed by groove O' at the same time. This groove O' is made large and deep enough to allow the performance of the functions just specified and still permit the blank portion of the valve at this point to close both of said openings $o'$ and $o^3$ when vapor is not wanted in chamber C. The tapering extension of groove O', which is made similarly to extensions $l$ and $l'$ and serves a similar purpose, also permits any vapor that may remain in the generating-chamber D after a previous administration to gradually pass into chamber C when the device is again used, so as to avoid the danger which would attend a sudden inhalation of a too great or unsafe quantity of anesthetic or medicated vapor.

Upon the face of the chamber C is mounted a graduated dial $g$, with graduations in the quadrants from $z^3$ to $z$ and from $z$ to $z'$. An indicator $i$, mounted on the valve V, travels over the face of this dial like the hand of a clock. This indicator is so mounted on the valve V that when it is at the mark $z$ the air coming in through nipple $n$ passes mostly upward through groove O, Fig. 5, out through opening $o^2$ into the mixing-chamber C, while a very small amount of it passes through the groove O downward and out through the tapering extension $l'$ into the tube $t$ and from thence out into the anesthetic in cup D through the perforations in said tube. At the same time groove O' is so situated in reference to openings $o'$ and $o^3$ that whatever vapor is generated in chamber D passes through opening $o'$ and into said groove, but very little of it passing through opening $o^3$ into the mixing-chamber C, as the tapering extension of said groove O' is very slightly exposed to said opening $o^3$. The vapor that does pass into the chamber C at once mixes with the great excess of air which has come from opening $o^2$, and consequently produces only slight anesthesia. Figs. 5 and 9 illustrate this condition. As the valve V is turned from left to right the indicator $i$, traveling over the graduations on the dial, informs the operator of the positions of the grooves O and O'. The higher up the indicator travels from position $z$ the less the amount of air sent into the mixing-chamber C, while the amount of air sent into the generating-cup D grows greater and the groove O' conducts more and more vapor into the chamber C, where the vapor meets the decreasing amount of air and causes the patient to inhale anesthetic vapor increasing in strength until the indicator reaches the point $z'$, where, as shown in Figs. 6 and 10, no air is entering the mixing-chamber C, but all of it is sent down into the anesthetic-chamber D, where the vapor is generated in large quantity and passes up through the opening $o'$ and groove O' and opening $o^3$ into the mixing-chamber C. The patient then inhales the pure vapor through nipple $n'$ without any admixture of air in the mixing-chamber. Every degree on the dial up which the indicator moves from $z$ to $z'$ increases the quantity of anesthetic vapor generated in practically the same proportion as the quantity of air entering the chamber C is reduced. As the indicator $i$ proceeds from $z'$ to $z^2$ the valve V still obstructs opening $o^2$ and gradually closes the entrance from nipple $n$ and opening $o'$, but not exit $o^3$, until the point $z^2$ is reached, at which position the valve shuts out all air from entering either chamber C or D and closes opening $o'$, so that no vapor, if generated, can leave the generating-chamber D. This situation is shown in Figs. 7 and 11. As the indicator $i$ proceeds around the dial from $z^2$ to $z^3$ the air-entrance $n$ and the vapor-entrance $o'$ remain closed throughout. Figs. 8 and 12 show the position of the valve with the indicator on the $z^3$ mark, the result being that the apparatus is inactive from the $z^2$ position to the $z^3$ position. From the $z^3$ position to the $z$ position the air once more enters the groove O, at first entering gradually through the extension $l'$ and out through opening $o^2$ into chamber C; but no anesthetic is generated until the valve arrives at the $z$ position, when the air begins to descend into the chamber D, the opening $o'$ having been gradually freed by the valve V as it left the position $z^3$. The result of this revolution of the valve is that from the position $z^3$ to the position $z$ nothing but air enters the mixing-chamber. From $z$ to $z'$ anesthetic vapor begins to be formed at $z$, increasing in quantity and purity until the $z'$ position is reached, where the maximum strength of anesthetic is produced. From $z'$ to $z^2$ the anesthetic gradually reduces in volume. No mixing with air, however, is taking place until $z^2$ is reached, when both anesthetic generation and entrance of air cease and continue so until $z^3$ is reached, where air again begins to enter the mixing-chamber C.

In practice the tank-cylinder T', Fig. 1, carrying the generating and mixing device just described, is elevated in the cylinder T by means of the cord $r$ and pulley $b$, and as it rises the pressure on valve V in the top of cylinder T' forces it down in its frame $x$, Fig. 20, and admits the air into the said cylinder T', the lower open end of which cylinder remains in the water placed in cylinder T, a spring $m$ in said frame $x$ restoring the valve V' to its normal position when the outside pressure is released. The cylinder T' may be graduated in cubic feet or gallons, as shown in the elevated position of cylinder T' in cylinder T in Fig. 1, so as to enable the operator to compress a definite amount of air into the same, if he so desires. The inner cylinder T² may be dispensed with, if desirable, as its only purpose is to save the extra weight of water necessary to be used in cylinder T when no such inner cylinder is present. The air thus compressed in tank T T' passes out through nipple $n^2$ into nipple $n$ of the generating and mixing device, the said device having been previously attached to the frame $f$ and the said nipples connected together by the tube $t$, from which nipple $n$ the air passes either into chamber C or chamber D, or neither one, according to the position of valve V in its sleeve A, as described.

Nitrous-oxid gas under pressure is now commonly used by the dental profession and others, and in case the operator desires to use the gas with this device I provide cylinder T' with a petcock or valve $c$, through which the gas may be admitted into the tank and, if desired, at the same time be mixed with a definite quantity of air therein by the elevation of cylinder T'. The gas or mixture can then be administered through the nipples and tubes and the mixing-chamber C without using the generating cup or chamber D. The valve V for such a purpose would be used only between the positions $z$ and $z^3$, for throughout that reversed quadrant-opening $o$ is closed by the valve and opening $o^2$ is freed by groove O, opening $o^2$ being gradually relieved by the tapering extension $l$ of groove O as it approaches that opening in turning the valve from right to left.

What I claim as my invention, and desire to secure by Letters Patent, is—

1. In an anesthetic generator and mixer a reservoir of air under pressure a tube leading therefrom through a controlling-valve to a mixing-chamber and to a generating-chamber and an opening leading from the generating-chamber through a controlling-valve to the mixing-chamber and an inhalation-tube leading from the mixing-chamber, substantially as described.

2. In an anesthetic generator and mixer the combination of a reservoir of compressed air with a mixing-chamber in communication through a controlling-valve with said reservoir of compressed air, a generating-chamber having a perforated air-inlet tube in connection through a controlling-valve with a tube leading from the air-reservoir and a vapor-opening leading from said generating-chamber through a controlling-valve into said mixing-chamber, and an inhalation-tube leading from said mixing-chamber, said controlling-valves regulating the relative proportion of air and vapor admitted to and escaping from said mixing and generating chambers respectively, substantially as described.

3. In an anesthetic generator and mixer the combination of a reservoir of air under pressure a tube leading therefrom through a groove provided with tapering extensions in a controlling-valve into a mixing-chamber and into a generating-chamber and an opening leading from the generating-chamber through a groove provided with tapering extensions in a controlling-valve into the mixing-chamber and an inhalation-tube leading from the mixing-chamber, the said controlling-valves and their grooves and extensions regulating the relative proportion of air and vapor admitted to and escaping from said mixing and generating chambers, respectively, substantially as described.

4. In an anesthetic generator and mixer the combination of a generating-chamber and a mixing-chamber each having an air-inlet controlled by a regulating-valve, and a vapor passage-way between said chambers controlled by a regulating-valve for the uses and purposes described.

In testimony whereof I do hereunto subscribe my name, in the presence of two witnesses, this 14th day of May, 1904.

DAVID D. WEISELL.

Witnesses:
E. E. WILLIAMS,
H. S. GLENN.